Jan. 24, 1950     E. A. J. GAGLIARDI ET AL     2,495,248
SMELTING PROCESS OF RECOVERING CHEMICALS FROM
THE BLACK LIQUOR DERIVED IN PULP MILLS
Filed Aug. 8, 1946
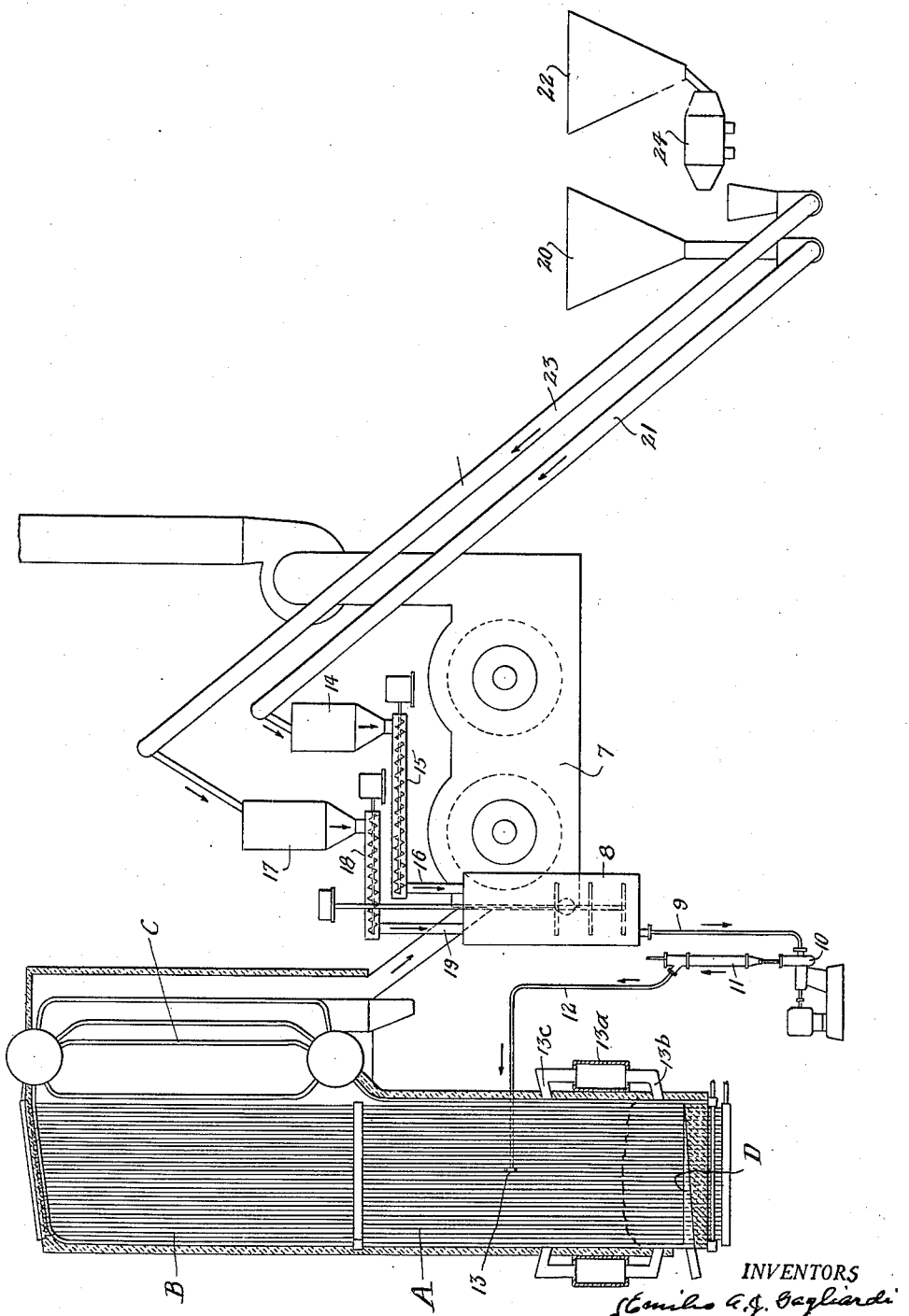
INVENTORS
Emilio A. J. Gagliardi
BY Charles Mellor and
Alexander L. Hamm
Symmestvedt & Lechman
attys.

Patented Jan. 24, 1950

2,495,248

UNITED STATES PATENT OFFICE 2,495,248

SMELTING PROCESS OF RECOVERING CHEMICALS FROM THE BLACK LIQUOR DERIVED IN PULP MILLS

Emilio A. J. Gagliardi and Charles Mellor, Buenos Aires, Argentina, and Alexander L. Hamm, New York, N. Y.; said Hamm assignor to Combustion Engineering-Superheater Inc.

Application August 8, 1946, Serial No. 689,154

3 Claims. (Cl. 23—48)

This invention relates to chemical recovery systems for the sulphate process of pulp manufacture for paper mills and the like, and its nature, objects and advantages will be best understood from the following:

In the sulphate process employed in pulp manufacture, the mixture of sodium hydrate or caustic soda (NaOH) and sodium sulphide ($Na_2S$), known as "white" liquor is used in the digester as a solvent for the undesired substances of the wood. It is known that sulphur dissolved in soda liquor, even in small quantity, will improve the quality of the fiber and increase the yield. The sodium sulphide in the liquor solution partly hydrolizes into sodium hydrate and a sodium sulph-hydrate, the sodium hydrate becomes active and combines with the acids that result from the decomposition of the lignins, and thus the sodium sulphide becomes available as active alkali in the proportion that it is used up. The resulting action of this reserve soda on the wood is assumed to be less drastic and to account for the improved fiber and yield. Thus it is generally known that the amount of sodium sulphide present in the white liquor for the digester, controls the results produced by the sulphate process. If too small a quantity of sodium sulphide is present, the "cook" or pulp produced, yields a shorter broomier fiber, resulting in a weaker fiber. While it is not definitely known just what are the reactions which control the type of fiber produced, it is nevertheless known that the presence of sodium sulphide performs a definite function in stopping or checking the drastic action of sodium hydrate when active alone, as in the "soda" process.

The term "sulphidity" as used by the paper manufacturer, is the ratio of sodium sulphide ($Na_2S$) to the total alkali present in the liquors. This sulphidity ratio is taken after the "green" liquors from the recovery furnace are treated with lime and become what are then known as "white" liquors, which are the liquors now ready for reuse in the digesters. The total alkali is the sum of all the sodas present in the white liquors. To be able to vary the sulphidity ratio at will and with ease and yet ensure satisfactory operation of the recovery furnace is of great importance to the process.

In the process, wood chips are cooked in the white liquor within the digesters and the resulting pulp is washed and prepared for shipment or use. The removed liquor, known as "black" liquor, is passed through evaporators to obtain greater concentration, and is then burned in special furnaces to remove organic matter, the dissolved non-fibrous portion of the wood. Before entering the furnace sodium sulphate ($Na_2SO_4$), a dry crystalline substance known as "salt cake," is added to the black liquor. The black liquor is a complex mixture of organic and inorganic compounds of carbon sulphur and sodium, in many forms. When heat is applied, sodium carbonate ($Na_2CO_3$), sodium sulphide ($Na_2S$), traces of caustic soda (NaOH), small amounts of sodium sulphate ($Na_2SO_4$), and other sodium-sulphur compounds appear in the smelt. During the burning and recovery process within the furnace, the sodium sulphate in the liquors, reacts with the carbon present and is reduced to sodium sulphide, which, as explained above, has a definite and important place in the process. The smelt from the furnace is dissolved in a solution of weak liquor, and the mixture becomes known as "green liquor." Green liquor contains sodium carbonate, a trace of caustic soda, sodium sulphide, and traces of other salts. Slaked lime is added to the green liquor and combines with the sodium carbonate to form caustic soda and calcium carbonate, which last is filtered out. The resulting fluid is the "white" liquor referred to above, containing sodium hydrate and sodium sulphide, and it is then ready for reuse as a solvent in the digester process.

The sulphidity of the white liquor is varied by varying the amount of salt cake added to the black liquor prior to its entry into the furnace. This added charge changes the general performance of the so-called "ash" on the hearth and will be referred to again.

The concentrated black liquor, after having been heated to a predetermined temperature, is sprayed under pressure into space in the furnace, where it is dried and partly volatilized by the heat from the "burning" combustible constituents in the liquor. Part of the combustion occurs in the space, but the larger part takes place on the hearth, at the bottom of the furnace, onto which the sufficiently dried portions of the sprayed liquor falls as so-called "ash."

The combustion in the furnace occurs preferably in the presence of heat absorbing surfaces such as water cooled tubes, forming part of a steam generator. The recovery units are self-sustaining, that is, there is a commensurate amount of heat required to be carried into the furnace by the black liquor to compensate for heat given up to the absorbing surfaces and the heat required for the successful drying and burning of the combustible constituents on the hearth.

Thus a satisfactory black ash the reduction of $Na_2SO_4$ are obtained.

In the past, the heat value of the black liquor amounted to about 7000 B. t. u.'s per lb., which was adequate for successful, self-sustaining operation. Recently, however, paper mills using the sulphate process have found it highly desirable to remove what is termed the "soap." This soap is a light substance consisting of the fats, resins and turpentine of the wood, and has a high calorific value, on the order of about 14,000 B. t. u.'s per lb. In this recent practice, about 10% of the dry solids of the liquor is removed in the form of soap, which is sold for other processes and purposes. Through this practice the heating value per lb. of dry solids of the black liquor is robbed of about 300 B. t. u.'s to 400 B. t. u.'s per lb.

Moreover the sulphate process has been recently adapted or coupled to bleaching processes in which a larger amount of chemical is necessary to obtain the proper fiber for the bleaching processes. Through the combination of soap removal and higher chemical charge to the furnace, the black liquors produced in these recent practices have a heating value of only from about 6000 to 6300 B. t. u.'s per lb., instead of the earlier heat values of around 7000 B. t. u.'s per lb. This reduction of heat value seriously interferes with satisfactory and self-sustaining furnace operation and substantially impairs recovery.

Thus it has been found in smelting the lower heat value liquors above referred to, that there is a tendency for the liquors, when they are damp, to ball up or stick together in the furnace, making it difficult for the air to penetrate to the combustibles therein, which is so necessary to produce the steady, free-burning and free smelting properties of the black ash bed on the hearth. When this condition occurs, what the operators refer to as a "black" or "wet hearth," results. When the black ash bed thus "wets down," it looses ignition.

One of the primary objects of the invention is to overcome the above difficulties which have arisen in modern operation, through the maintaining of the desired ashing conditions on the hearth, to secure efficient recovery of chemical, while at the same time securing control of sulphidity.

How the foregoing, together with such other objects and advantages as may hereinafter appear, or are incident to our invention, are realized is illustrated in the accompanying drawing which is a more or less diagrammatic side elevation of a recovery unit, partly in section, embodying the invention.

The recovery furnace is preferably of the type shown in the United States patent to Hamm, No. 2,319,399. In brief, the furnace is tall and is comprised of a furnace section proper A, opening into a chamber B located immediately thereabove. At the bottom of the furnace A there is diagrammatically shown a refractory hearth D, the dimensions of which may vary. Furnace A and chamber B are lined with bare water-walled tubes connected into the circulation of the boiler C. By far the greatest amount of steam is developed in the wall tubes. For further details of the furnace boiler unit and its operational characteristics, reference may be had to the aforesaid Hamm patent.

Air is introduced into the lower part of furnace A by means of the conduit 13a and the ducts 13b and 13c. Ducts 13b deliver into the bed of ash which accumulates on the hearth, the amount of air being sufficient for reducing purposes. The ducts 13c deliver into the space above the ash bed and supply the balance of the air needed for combustion.

The black liquor at the desired density (say from about 60% to about 70% solids), at a pressure of say from about 10 lbs. to about 25 lbs. p. s. i. and at a temperature of say from about 180° F. to about 240° F., preferably around 235° F., is introduced into the furnace through the nozzles 13. To this end a variable speed controllable pump 10, pumps the concentrated black liquor through one or more heaters 11 and pipe 12 to the burners.

In its flight through and descent in space in the furnace, the black liquor particles are dried and partly volatilized by the heat from the burning combustible constituents in the liquor, the combustion occurring as above pointed out, partly in space and partly on the hearth.

The manner in which the operational difficulties, incident to modern low heat value, high chemical content, black liquors, are overcome while at the same time control of sulphidity is obtained, will now be described. Broadly speaking, we add, at a suitable point or points, a material or materials which, while enriching the black liquor in a practical manner to restore the original heat value thereof and to prevent the tendency of the black liquor to agglomerate on the hearth and form a "wet" bed and to permit of a more uniform penetration of the air through the bed, also has to do with the control of sulphidity. The material which we prefer to use for performing these functions is low ash coke, either in ground or in pulverized form. The sulphur contained in the coke will add beneficial sulphur to the system. Coals, petroleum cokes, or other similar fuels high in carbon and low in ash and which contain sulphur, may be used, in a similar form or forms of physical condition.

The black liquor, after having been concentrated to a desired density in evaporators (not shown), is introduced into the cascade evaporator 7 from which it is delivered into a mixing tank 8 and thence via pipe 9 to pump 10 and ultimately to the nozzles 13. In the mixing tank 8, the black liquor is mixed with salt cake delivered thereto from the surge bin 14 by the feeder 15 and pipe 16. The feeder 15 is operated by a variable speed controllable motor. The mixing tank 8 is provided with stirring devices such as paddles.

According to the preferred form of the invention, the coke is also delivered to the mixing tank 8 whereby the contents of salt cake, coke and black liquor are thoroughly mixed. To this end coke received at the plant is stored in a storage bin 22 from whence it is delivered to the surge bin 17 by the conveyor 23, after having been ground to proper size in the mill 24. From the surge bin 17, the coke is delivered to the mixing tank 8 by means of the feeder 18 and pipe 19. The feeder 18 is driven by a variable speed controllable motor. The salt cake is stored in a bin 20 and is led to the surge tank 14 by means of the conveyor 21.

In operation, when the mixed substances are sprayed into the furnace, the particles of coke and salt cake are dispersed throughout the dry solids of the black liquor after dehydration has taken place. The presence of the coke particles dispersed throughout the dry solids on the hearth is advantageous. The coke particles, while substantially dry and porous, have capacity to separate the sticky particles of black liquor and prevent the balling up or binding together of the black ash collecting on the hearth. The separated and dispersed coke particles may be considered as introducing fissures or small channels throughout the black ash pile. By virtue of this, air supplied to the furnace readily and quickly reaches a relatively greater amount of the dry solids so as to cause an increase in the reduction reactions of the carbon and oxygen, to produce sodium sulphide, and the excess carbon over normal requirements, burns to $CO_2$ to develop a higher heat in the furnace for the generation of steam. The sulphur contained in the coke will also melt to add more sulphur to the smelt.

Preferably we employ a weight of coke between 6% and 8% of the total weight of the dry solids supplied to the furnace. This weight is substantially the same as the weight of salt cake supplied. If it be considered that coke has an approximate heating value of about 14,500 B. t. u.'s per lb. and that for each 3000 lbs. of dry solids contained in the black liquors and fed to the furnace, 200 lbs. of coke is supplied, there is added to the furnace approximately 970 B. t. u.'s for every lb. of dry solids. Assuming that the dry solids have a heating value of 6100 B. t. u., then, with the addition of the coke, there is obtained in 1.06 lbs. of fuel supplied, a heating value of 7070 B. t. u., or a new substance having a heating value of 6700 B. t. u. approximately.

A furnace operated with the fuel value of 6100 B. t. u. is much more difficult to operate than one with a fuel value of 6700 B. t. u., as the added 600 B. t. u. increases the amount of gases and raises the furnace temperatures, producing what may be termed a hotter furnace. Thus the loss of heat value in the black liquors of recent practice is compensated for and the ashing conditions of the fuel bed are such as to counteract the presence of the additional chemical employed. A smelt having a controlled weight of sodium sulphide is obtained, producing a white liquor of high sulphidity wherewith to obtain improved fiber and yield. The operating difficulties are overcome.

By reason of the controllable feeding of the salt cake and the coke, it is possible to deliver to the mixing tank or other place in the system, a ratio of coke and salt cake such as will give desired results with respect to both the ashing and the sulphidity. It is also possible to change this ratio at will by an increase or decrease of the amount of salt cake and coke introduced; and to increase or decrease the total amount of salt cake and coke, in accordance with the rate at which it is desired to operate the furnace.

Thus the aforementioned operating difficulties are overcome, a high yield of chemical is obtained, and the needed control of sulphidity achieved.

The chemical withdrawn from the smelter furnace is, as hereinbefore pointed out, dissolved in a solution of weak liquor and the resultant mixture becomes known as "green" liquor. When the slaked lime is added thereto, the so-called "white" liquor results and is ready for reuse as the solvent in the digester process. The green liquor is first led to a decanting tank (not shown), in which tank the liquors are settled to remove all suspended solids before they are sent to the causticizing tank or tanks in which the white liquor mixture is formed. Hence the coke ash produced in the smelting operation is settled out and drawn off to the refuse piles with the other undesirable grit or dirt found in all green liquors.

The coke ash withdrawn with the smelt stream has a higher fusing temperature than the temperature of the smelt, which latter is around 1600° F. Therefore, when the smelt and coke ashes strike the liquors of the main dissolving tank, they are chilled, the temperatures prevailing in the dissolving tank being in the neighborhood of 180° F. In view of the foregoing, it will be seen that no difficulty is encountered by reason of the ash content of the coke or other fuel used.

While we have indicated our preference of spraying the black liquor into the furnace in space, and while we have indicated preferred temperatures and pressures at the nozzles, it is to be understood that the invention is not limited thereto and that the concept of enriching the black liquor and the controlling of the sulphidity, will be applicable to other conditions and modes of firing.

We claim:

1. In the continuous smelting process of recovering chemical from the black liquor derived in pulp mills from digesting the cellulose with white liquor, in which the black liquor in concentrated and then substantially continuously sprayed into a boiler furnace to gravitate therein to be dried for combustion of the combustible constituents thereof and in which salt cake is substantially continuously introduced into the black liquor prior to its introduction into the furnace and in which the chemical is recovered as a smelt in the furnace and the smelt is treated to obtain white liquor for re-use in the digestion of further cellulose, the step of controlling the sulphidity of the white liquor obtained from the smelt by substantially continuously introducing coke in particle form into the black liquor prior to the introduction of such black liquor into the furnace and thereby also assisting in making up any deficiency of B. t. u. of the black liquor for self-sustaining operation.

2. In the continuous smelting process of recovering chemical from the black liquor derived in pulp mills from digesting the cellulose with white liquor, in which the black liquor is concentrated and then substantially continuously sprayed into a boiler furnace to gravitate therein to be dried and for combustion of the combustible constituents thereof and in which salt cake is substantially continuously introduced into the black liquor prior to its introduction into the furnace and in which the chemical is recovered as a smelt in the furnace and the smelt is treated to obtain white liquor for re-use in the digestion of further cellulose and in which soap is removed from the black liquor, the step of simultaneously controlling sulphidity of the white liquor so obtained and replacing the B. t. u.'s lost by removal of the soap by substantially continuously introducing coke in particle form into the black liquor prior to its delivery to the furnace in an amount compensating for the reduction in B. t. u.'s in the black liquor incident to the removal of the soap.

3. In the continuous smelting process of recovering chemical from the black liquor derived in pulp mills from digesting the cellulose with white liquor, in which the black liquor is concentrated and then substantially continuously sprayed into a boiler furnace to gravitate therein to be dried and for combustion of the combustible constituents thereof and in which salt cake is substantially continuously introduced into and mixed with the black liquor prior to its introduction into the furnace and in which the chemical is recovered as a smelt in the furnace and the smelt is treated to obtain white liquor for re-use in the digestion of further cellulose, the step of controlling the sulphidity of white liquor obtained from the smelt by substantially continuously introducing coke in particle form into the black liquor at the point where the salt cake is introduced and mixed into the black liquor.

E. GAGLIARDI.
    CHARLES MELLOR.
    ALEXANDER L. HAMM.

REFERENCES CITED

The following references are of record in the file of this patent:

UNITED STATES PATENTS

| Number | Name | Date |
|---|---|---|
| 1,442,494 | Plumstead | Jan. 16, 1923 |
| 1,500,890 | Plumstead | July 8, 1924 |
| 1,555,512 | Nibecker | Sept. 29, 1925 |
| 1,575,473 | White | Mar. 2, 1926 |
| 1,580,269 | White | Apr. 13, 1926 |
| 1,605,928 | Drewsen | Nov. 9, 1926 |
| 1,779,537 | Goodell | Oct. 28, 1930 |
| 1,801,945 | White | Apr. 21, 1931 |
| 1,808,773 | Grondona | June 9, 1931 |
| 1,933,254 | Goodell | Oct. 31, 1933 |
| 2,213,052 | Rosencrants et al. | Aug. 27, 1940 |
| 2,258,467 | Owens | Oct. 7, 1941 |